United States Patent [19]

Chen

[11] 4,283,022
[45] Aug. 11, 1981

[54] DOUBLE-VOLUMED TAPE CARTRIDGE OPERATIVE AT TWO ENDS

[76] Inventor: Kuen-Ming Chen, 13, Alley 2, La. 58, Chienmei Rd., Hsinchu City, Taiwan

[21] Appl. No.: 105,262

[22] Filed: Dec. 19, 1979

[30] Foreign Application Priority Data

Nov. 26, 1979 [TW] Taiwan .................. 6824586 R.O.C.

[51] Int. Cl.³ .......................................... B65H 17/48
[52] U.S. Cl. ........................... 242/55.19 A; 242/197
[58] Field of Search ....................... 242/194, 197–200, 242/55.19 A, 55.19 R; 360/96, 132; 352/156; 226/187; 197/168

[56] References Cited

U.S. PATENT DOCUMENTS

| | | | |
|---|---|---|---|
| 3,240,441 | 3/1966 | Hunter et al. | 242/55.19 R |
| 3,490,671 | 1/1970 | Hladky | 226/187 |
| 3,532,283 | 10/1970 | Kawata | 242/55.19 R |
| 3,863,853 | 2/1975 | Umeda | 242/55.19 A |
| 3,918,569 | 11/1975 | Parker | 197/168 |
| 3,993,262 | 11/1976 | Longworth | 242/71.8 |

Primary Examiner—Leonard D. Christian
Attorney, Agent, or Firm—Browdy and Neimark

[57] ABSTRACT

A tape cassette comprising a cassette housing consisting of two substantially identical sections; a pair of reel spindles on one housing section and beside either end of the tape cassette; a slot between either pair of reel spindles and on the housing section mounted with reel spindles; two rods adjustably located within the slot; a plate with a slot propping on the two rods to receive the tape coming from one reel spindle for preventing the same from abrasing other parts of the tape; a plate on one tape reel on the reel spindle for regulating the tape speed and cooperating the plate on two rods to prevent the tape from loosening when the tape is turned upside down; a tape pack circulating around either pair of reel spindles through two pressure pads respectively for the magnetic head and the sound track switching device on the tape reproducing apparatus, a rubber roller and a guide rod.

9 Claims, 4 Drawing Figures

DOUBLE-VOLUMED TAPE CARTRIDGE OPERATIVE AT TWO ENDS

BACKGROUND OF THE INVENTION

1. Field of the Invention

The present invention relates to a tape cartridge comprising two tape packs, each being operative at respective end of the tape cartridge and improved apparatus against tape friction and tape deviation.

2. Description of the Prior Art

Each conventional tape cartridge contains only one tape pack to cooperate with tape reproducing apparatus through openings provided at one end of the tape cartridge to receive the magnetic head, the sound track switching apparatus, and the capstan in the tape reproducing apparatus.

The time of playing a whole tape pack in each conventional tape cartridge is about the same as that of playing a whole phonographic disk. A whole phonographic disk including two faces to be played throughout requires about thirty minutes to forty minutes. Accordingly, the tape in the conventional tape cartridge having four sound tracks, requires about ten minutes to play throughout one sound track. In fact, inside the conventional tape cartridge containing such forty-minute tape pack, there is still much space to be utilized.

In such conventional tape cartridge, tape deviation happens frequently especially when used in the running cars which cause serious vibration. When such conventional tape cartridge is turned upside down, the tape is easy to loosen off its original position. In view of this, complicated structures such as division plates, slots and rails occupying much space are provided in conventional tape cartridges.

Another disadvantage of such tape cartridge is the friction caused between the innermost layer of the supply tape reel and the layer next to it when the innermost layer leaves the reel spindle.

SUMMARY OF THE INVENTION

The present invention economically utilizes the space inside the conventional tape cartridge to mount a second tape transport mechanism for receiving a second tape pack. The second tape pack cooperates with tape reproducing apparatus through openings provided at the other end of the tape cartridge for receiving the magnetic head, the sound track switching apparatus, and the capstan on the tape reproducing apparatus. Accordingly, one object of the present invention is to double the storage of the tape amount inside the conventionally-sized tape cartridge.

Another object of the present invention is to avoid tape deviation by providing a pair of tape guide rods adjustably located, depending on the size of the tape pack.

Further object of the present invention is to regulate the tape speed and to prevent the tape reel from falling off the reel spindle by providing a controlling plate on the winding tape reel.

Further object of the present invention is to provide a supply reel axle with a tapered base so that when leaving the reel spindle, the innermost layer of the supply tape reel is relatively spaced off the layer next to it and thereby avoids the friction therewith.

Further object of the present invention is to provide a guide plate with a guide slot to receive the tape coming from the supply tape reel and thereby prevent the same from touching and rubbing other parts of the running tape.

Other objects and features of this invention will be more apparent from the following detailed description with reference to the accompanying drawings.

It is therefore the present invention provides a tape cassette comprising a cassette housing consisting of two substantially identical secitons; a pair of reel spindles on one housing section and beside either end of the tape cassette; a slot between either pair of reel spindles and on the housing section mounted with reel spindles; two rods adjustably located within the slot; a plate with a slot propping on the two rods to receive the tape coming from one reel spindle for preventing the same from abrasing other parts of the tape; a plate on one tape reel on the reel spindle for regulating the tape speed and cooperating the plate on two rods to prevent the tape from loosening when the tape is turned upside down; a tape pack circulating around either pair of reel spindles through two pressure pads respectively for the magnetic head and the sound track switching device on the tape reproducing apparatus, a rubber roller and a guide rod.

DETAILED DESCRIPTION OF THE PREFERRED EMBODIMENT

Figure 1:
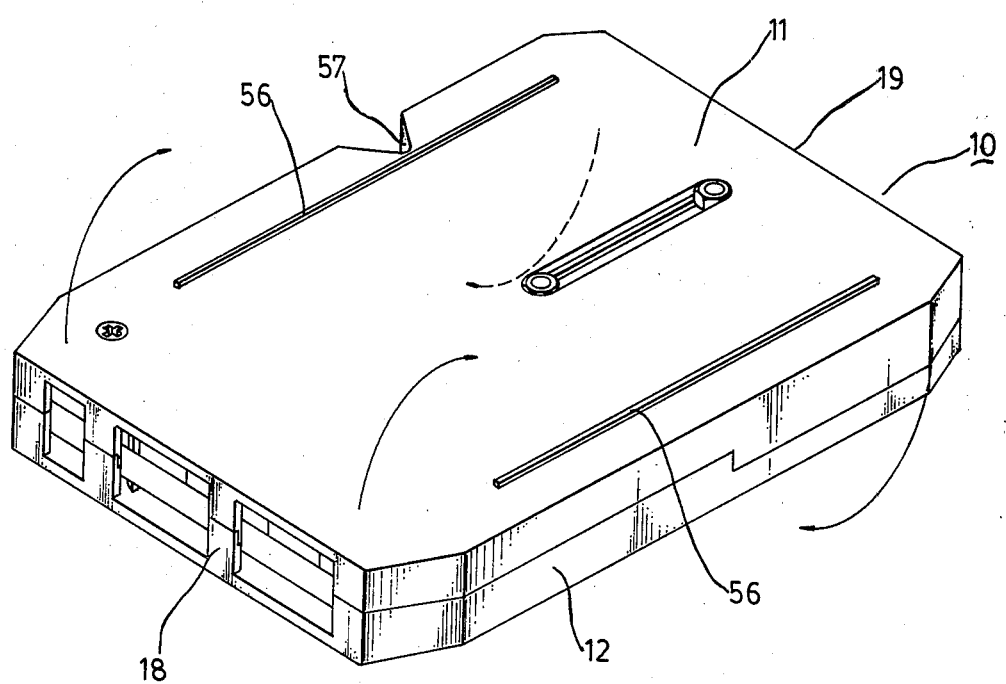
FIG. 1 is a perspective view of the cassette housing in accordance with the present invention.
Figure 2:
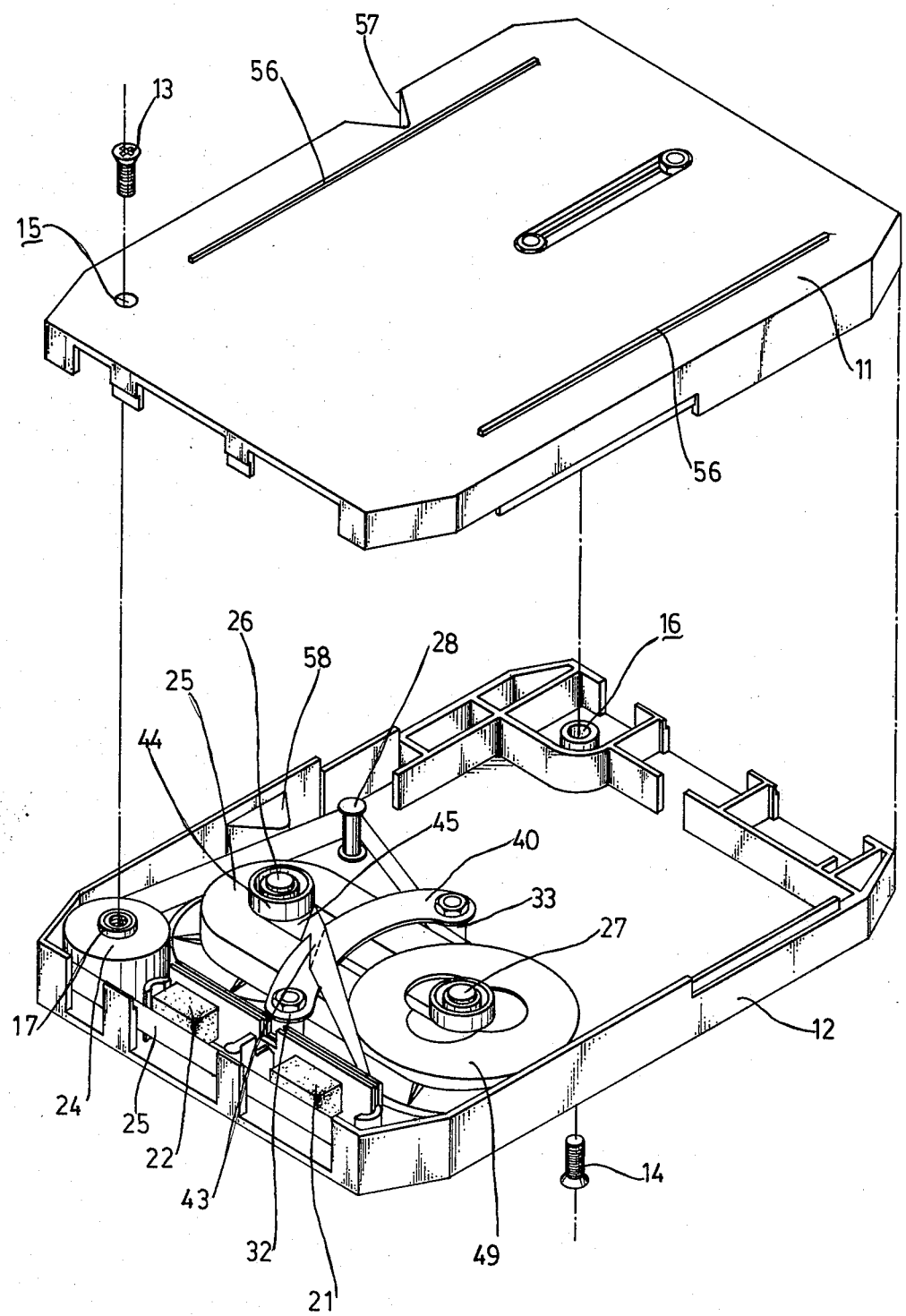
FIG. 2 is an exploded perspective view of the tape cassette showing one of a pair of tape transport mechanism sets.

Referring to FIG. 1 and FIG. 2, a cassette housing 10 consists of two substantially identical sections 11, 12 fastened together by screwing a pair of screws 13, 14 respectively into a pair of screw holes 17, each in the axle 23 of a rubber guide roller 24 provided respectively on sections 11, 12.

On each outer face of sections 11, 12 are provided two guide rails 56 for guiding the cassette housing 10 into the tape reproducing apparatus. On one side wall of each section 11, 12 is provided a concave 57, 58 to receive a spring trigger on the tape reproducing apparatus for locking the tape housing 10.

Figure 3:
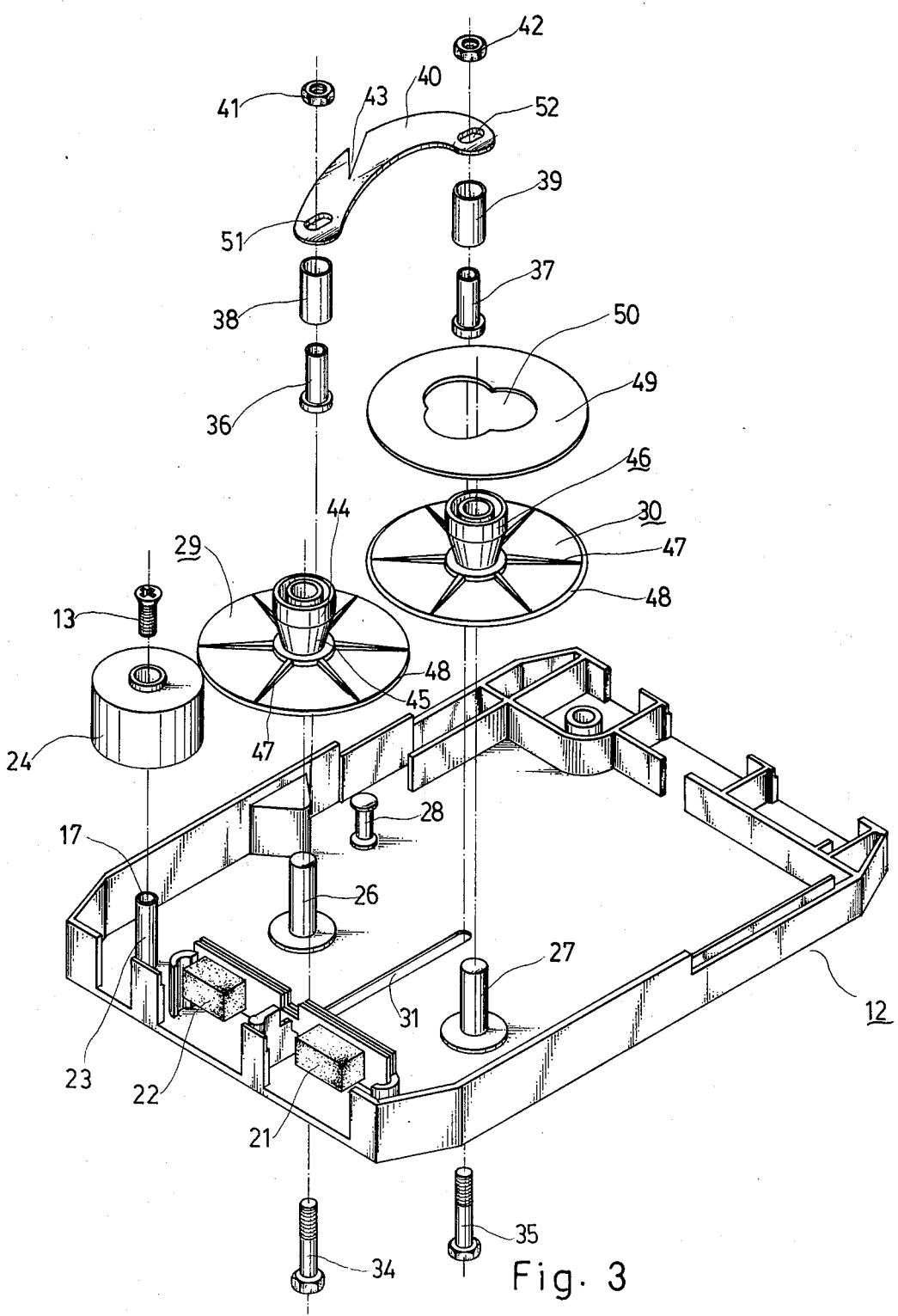
FIG. 3 is a further exploded perspective view of one of a pair of tape transport mechanism sets on the lower half of cassette housing.

Referring to FIG. 2 and FIG. 3, on one end 18 of the lower section 12 and parallel to the guide roller 24 are provided a pressure pad 21 for the sound track switching device and a pressure pad 22 for the magnetic head on the tape reproducing apparatus. Beside the end 18 is provided a set of tape transport mechanism which comprises primarily a supply spindle 26, a winding reel spindle 27 and a guide rod 28. The supply reel spindle 26, the winding reel spindle 27 and the guide rod 28 are provided on the section 12 and integral with the same. On the reel spindle 26 is loaded a reel base 29; on the reel spindle 27 is loaded a reel base 30.

When the cassette housing 10 is set into the tape recording apparatus, the guide roller 24 contacts with the capstan on the tape reproducing apparatus and thereby energizes the running of the tape. The tape 25 coming from the reel base 29 passes in turn through the pressure pads 21, 22, the guide roller 24, the guide rod 28 and the winding reel spindle 27, finally returns to the supply reel base 29, accomplishing a circulating path.

On the lower section 12 and between the reel spindles 26, 27 is provided a slot 31. Two guide rods 32, 33 are adjustably located within the slot 31, depending on the diameter of the tape reel on the supply reel base 29 as shown by mark "a" in FIG. 2. In order to adjust its location within the slot 31, each guide rod 32, 33 comprises a screw bolt 34, 35 and a screw cap 36, 37 screwed together through the slot 31. To facilitate the running of the tape, around each guide rod 32, 33 is mounted a sleeve 38, 39.

Propping on the guide rods 32, 33 is a crescent-shaped guide plate 40 with a guide slot 43 to receive the tape coming from the reel base 29 and thereby prevent the same from touching and rubbing other parts of the running tape. For each guide rod 32, 33 to adjust its location within the slot 31, a tube-shaped opening is provided on the guide plate 40 to let pass each guide rod 32, 33 so that each guide rod 32, 33 can move in a certain degree within the tube-shaped opening when adjusting its location within the slot 31. The direction and the position of the guide slot 43 on the guide plate 40 are suitable for the tape coming from the reel base 29 to smoothly continue its circulation through the guide slot 43.

Figure 4:
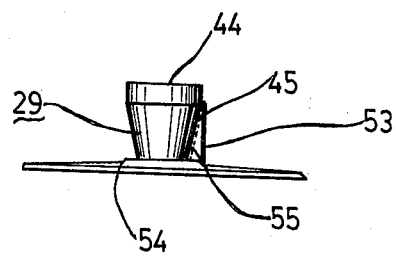
FIG. 4 is an explanatory view of the supply reel spindle showing the original position of the innermost layer of the supply tape reel and the position thereof at the moment of leaving the reel spindle.

Referring to FIG. 4, each reel axle 44, 46 is tapered downwards a little below its top and has a base portion 54 in the form of a flat cone. In the original position, the innermost layer of the tape reel on each reel base 29, 30 stands vertically on the base portion 54 of each reel axle 44, 46. At the moment of leaving each reel axle 44, 46, it slides over the base portion 54 to join with the tapered plane 45 of each reel axle 44, 46 as shown by broken lines 55, thereby is relatively spaced off the layer next to it and avoids the friction therewith.

On the upper face of the bottom 48 of each reel base 29, 30, are provided a plurality of radial rails 47 for facilitating the running of the tape. Each tape reel on each reel base 29, 30, with its lower face touching only the rails 47, has lesser sliding friction with the bottom 48. The thickness of the peripheral edge of the bottom 48 is gradually thinner in a radial direction so that the tape can smoothly pass over the periphery of the bottom 48 when leaving each reel base 29, 30.

On the tape reel on the winding reel base 30 is provided a ring-like controlling plate 49. Along the central hole of the controlling plate 49 are provided a plurality of half-circular concaves so that the controlling plate 49 makes intermittent contact with the winding reel spindle 27 when rotating accompanying the tape reel under it. Due to the friction between the controlling plate 49 and the tape reel under it, the controlling plate 49 has lesser rotating speed than the tape reel under it, thereby effecting a force to regulate the running of the tape.

Beside the other end 19 of the tape cassette is provided another tape transport mechanism as described above. To operate the tape mounted on the tape transport mechanism beside the end 19, the cassette housing 10 can be easily turned over as shown by the arrows in FIG. 1. There is no fear in tape loosening, thanks to the guide plate 40 and the controlling plate.

As this invention may be embodied in several forms without departing from the spirit or essential characteristics thereof, the present embodiment is therefore for illustration only and not for restriction. The scope of the invention shall be defined by the appended claims.

What is claimed is:
1. A tape cassette comprising:
   a cassette housing consisting of two substantially identical sections, one of said sections having a first slot therein;
   at least one tape transport mechanism in one of said sections, said transport mechanism including a pair of reel bases, a pair of reel spindles and a first guide rod, said pair of reel bases being loaded on said reel spindles and said first slot being positioned between said reel spindles of said pair of reel spindles;
   two further guide rods located within said slot;
   a first plate extending between said further rods and having a second slot therein, said second slot being positioned to receive tape;
   a second plate on a reel loaded on one of said reel bases and rotatable accompanying said reel; and
   a rubber roller and two pressure pads defining with said first guide rod and said second slot a tape path;
   wherein the other of said two substantially identical sections has a further first slot therein;
   at least one further tape transport mechanism in the other of said sections, said further transport mechanism including a further pair of reel bases, a further pair of reel spindles and a further first guide rod, said further pair of reel bases being loaded on said further pair of reel spindles and said further first slot being positioned between said reel spindles of said further pair of reel spindles;
   two additional further guide rods located within said further first slot;
   a further first plate extending between said two additional further guide rods and having a further second slot therein, said further second slot being positioned to receive another tape;
   a further second plate on a further reel loaded on one of said reel bases of said further pair of reel bases and rotatable accompanying said further reel; and
   a further rubber roller and two additional pressure pads defining with said further first guide rod and said further second slot another tape path.

2. A tape cassette as claimed in claim 1, including respective screw holes provided in axles of said rubber rollers, and respective screws extending through said sections and into said holes to fasten said two substantially identical sections together.

3. A tape cassette as claimed in claim 1, wherein said reel bases have reel axles having bottoms and are tapered downwards with a flat conical base portion formed on said bottoms thereof, a plurality of radial rails on said bottoms, the thickness of respective peripheral edges of said bottoms being gradually thinner in a radial direction from corresponding said reel axles.

4. A tape cassette as claimed in claim 1, wherein said second plate and said further second plate on said reel and said further reel are ring-like around said reel spindles, a respective central hole in respective said second plate and said further respective plate, and a plurality of half-circular concaves being provided along said central holes.

5. A tape cassette as claimed in claim 1, wherein each of said rods within said first slot and said further first slot comprise a respective screw bolt and a respective screw cap screwed together through associated ones of these slots between corresponding reel spindles of said pair of reel spindles and said further pair of reel spindles, a respective sleeve being mounted around each of said rods which extend through said first slot and said further first slot.

6. A tape cassette as claimed in claim 1, wherein said first plate and said further first plate are crescent-shaped and have two openings for passing said further two guide rods and said additional, further two guide rods.

7. A tape cassette as claimed in claim 1, wherein tape loaded on one of said reel bases passes in turn through said second slot on said first plate, said two pressure pads, said rubber roller, said first guide rod and the other reel base of the first said pair of reel bases and returns to the original reel base of this pair.

8. A tape cassette as claimed in claim 1, wherein tape loaded on one of said reel bases of said further pair of reel bases passes in turn through said further second slot on said further first plate, said further two pressure pads, said further rubber roller, said further first guide rod and the other of said reel bases of said further pair of reel bases and returns to the original reel base of this pair.

9. A tape cassette comprising:
a cassette housing having a first slot therein;
at least one tape transport mechanism within said housing, said transport mechanism including a pair of reel bases, a pair of reel spindles and a first guide rod, said pair of reel bases being loaded on said reel spindles and said first slot being positioned between said reel spindles;
two further guide rods located within said first slot;
a first plate extending between said two further guide rods and having a second slot therein, said second slot being positioned to receive tape;
a second plate on a reel loaded on one of said reel bases and rotatable accompanying said reel; and
a rubber roller and two pressure pads defining with said first guide rod and said second slot a tape path.

* * * * *